United States Patent [19]

Ross

[11] Patent Number: 5,421,096

[45] Date of Patent: Jun. 6, 1995

[54] GEAR DRIVEN ALIDADE ASSEMBLY

[75] Inventor: Thomas J. Ross, Largo, Fla.

[73] Assignee: Safco Corporation, Chicago, Ill.

[21] Appl. No.: 107,913

[22] Filed: Aug. 17, 1993

[51] Int. Cl.$^6$ ............................................. G01C 15/00
[52] U.S. Cl. ......................................... 33/290; 33/299
[58] Field of Search ............... 33/290, 291, 292, 299; 356/249

[56] References Cited

U.S. PATENT DOCUMENTS

| | | | |
|---|---|---|---|
| 3,092,911 | 6/1963 | Lotzuesell | 33/299 |
| 4,202,110 | 5/1980 | Kool | 33/299 |
| 4,771,545 | 9/1988 | Hisayasu et al. | 33/299 |
| 4,907,882 | 3/1990 | Waiber et al. | 33/292 |
| 5,108,177 | 4/1992 | Middleton | 33/291 |

FOREIGN PATENT DOCUMENTS

| | | | |
|---|---|---|---|
| 316727 | 12/1919 | Germany | 33/299 |
| 371711 | 3/1923 | Germany | 33/299 |
| 598232 | 6/1934 | Germany | 33/299 |
| 725353 | 9/1942 | Germany | 33/299 |
| 0089107 | 4/1991 | Japan | 33/290 |

Primary Examiner—Thomas B. Will
Attorney, Agent, or Firm—Augustus G. Douvas

[57] ABSTRACT

An alidade surveying instrument, comprising a pair of gimbeled yokes, a mounting base supporting the pair of gimbeled yokes for rotation on axes perpendicular to one another, a ranging device carried by the gimbeled yoke pair for targeting a remote object both as to elevation and azimuth, a first gear set coupled to one of the yokes and second gear set coupled to the other yoke, a pivot plate supporting one of the gears of each gear set for a varying degree of gear meshing with respect to its associated gear, and a spring for applying a variable force to the pivot plate for driving the gears of each gear set into a yielding engagement to counteract physical variations in the degree of gear set engagement as the gears of each set mesh and rotate relative to one another.

10 Claims, 7 Drawing Sheets

GEAR DRIVEN ALIDADE ASSEMBLY

The present invention relates generally to electronically-controlled mobile survey systems, and more particularly to a gear-driven alidade assembly for quickly and accurately providing information for locating assets geographically.

BACKGROUND OF THE INVENTION

Gas, electric and telephone utility companies continuously install and upgrade operating equipment (utility assets) in the areas serving their customer base. Proper identification and location is necessary for utility databases and field maintenance purposes. Additionally, reference landmarks for locations of previously installed assets in the field change as urban environments evolve. Consequently, utility companies must accurately locate and periodically re-locate these assets geographically in their databases. This is important, since only verifiable locations for assets, by an independent regulatory audit, are allowed to be included by the utility in the customer rate base.

Current industry practice primarily involves manual measuring methods and apparatus for locating assets. Typically, this involves recording distances measured from existing landmarks. This method is time consuming, subject to measurement error by the operator, and is sometimes difficult to interpret by auditors. Consequently, assets are included in the rate base only after considerable delay.

In the prior art, an alidade ranging apparatus has been used in a vehicle, however it is manually controlled and positioned. One operator must physically move the laser ranging device. Unfortunately, this method of surveying is still slow and usually required two persons—a driver and an operator.

SUMMARY OF THE INVENTION

A principal object of this invention is to facilitate the location of items, such as utility assets, through the use of an alidade.

Another object of the present invention is to provide an apparatus for surveying utility assets with an electronically-controlled, gear driven alidade assembly.

The principal structural features for attaining the object of this invention is summarily outlined in the following paragraphs. Other secondary features are described in the section entitled Detailed Description of the Preferred Embodiment.

A novel feature of this invention relates to an electronically-controlled gear driven alidade assembly for measuring and ranging utility assets in a mobile environment, operated by one person. An electronically-controllable survey system installed on a mobile vehicle, allows an operator to survey assets in a 360 circle (azimuth) around the vehicle, and −37 to +45 arc (elevation) without leaving the vehicle. Precise locations can be captured in a timely manner, and are easily verifiable.

The alidade assembly consists of a prior-art digital laser-ranging device, modified for installation of a charge Coupled Device (CCD) camera, and the elevation/azimuth drives. The color CCD video camera with an external head is used for video input into the operator interface, and is used by the vehicle driver to view target assets.

The azimuth and elevation motors located in the alidade assembly are turned with two stepper motor controllers. The azimuth drive provides a plus or minus 180 degree rotation relative to the front of the vehicle. The elevation drive provides for an up tilt of 45 degrees and a down tilt of 37 degrees from horizontal. In the reversing drive of the gear driven alidade assembly, near-zero backlash is critical to achieving and maintaining positional accuracy. Both elevation and azimuth drive assemblies utilize a skew-axis Helicon gear system (pinion and gear) marketed by Illinois Tool Works Company of Chicago, Ill. and described in U.S. Pat. Nos. 3,078,767, 3,091,021 and 3,105,412. A unique spring-loaded pivot plate absorbs gear/pinion variations as they mesh. The pinion motor assembly on both the elevation and azimuth assemblies pivot radially, maintaining tight perpendicularity tolerances with respect to its mating gear. Consequently, gear backlash is near-zero.

BRIEF DESCRIPTION OF THE DRAWINGS

In order that all of the structural and functional features for attaining the objects of the gear driven alidade assembly may be readily understood, detailed reference is herein made to the accompanying drawings, wherein.

DETAILED DESCRIPTION OF THE PREFERRED EMBODIMENT

Figure 1:
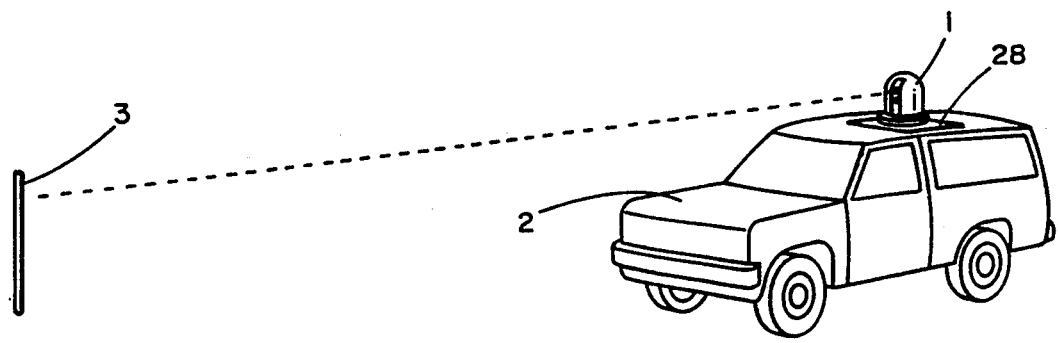
FIG. 1 shows an alidade assembly mounted on a vehicle roof, depicting a survey of an utility pole asset by providing angularity and distance information from a digital ranging device.

The electronically-controlled survey system utilizes an alidade assembly consisting of the DRA (Digital Ranging alidade), camera, azimuth, and elevation drive assemblies.

The DRA is a prior-art laser-ranging device, modified for installation of a CCD camera, and the elevation-/azimuth drives. The DRA contains an infrared pulsed distance measurement device and internal azimuth and elevation encoders. The DRA's measurements are made by measuring the time it takes a pulse of energy to make the round trip from the laser to its target and back. The internal azimuth and elevation encoders are controlled through a bi-directional signal data port.

A color CCD video camera with an external head is used for video input into the operator interface. The small and light weight CCD camera head is mounted on the top of the alidade assembly. A 10 to 100 mm lens is mounted to the CCD camera head with a Teleconverter. An operator can view a survey target shown on a touch screen video monitor mounted inside the vehicle.

The azimuth and elevation motors located in the alidade assembly are turned with two stepper motor controllers. Communications to the stepper motor controllers is through a signal port located on a main central processing unit card. Full control of the motors is available, including minimum and maximum speed rates and linear speed ramping. A motor step counter is also included internally to "home" the motor to any predefined position. The azimuth drive provides a plus or minus 180 degree rotation relative to the front of the vehicle. The azimuth assembly is moved with a stepper motor which operates at 6.7 volts at 1 amp. The elevation drive provides for an up tilt of 45 degrees and a down tilt of 37 degrees from horizontal. The elevation drive moves the alidade up and down with a stepper motor which operates at 12.0 volts at 600 mA supplying torque for raising and lowering the alidade assembly.

The surveying capability of the electronically-controlled survey system is 700 feet. To ensure the accuracy of the ranged asset location from the encoders, the gear-driven assemblies must be accurate to 30 arc-sec. To achieve this level of positioning accuracy, the gearing system must have near-zero backlash. Backlash in gears is the play between pinion teeth and gear teeth resulting from machining and mounting tolerances. In the reversing drive of the proposed survey system, near-zero backlash is critical to achieving and maintaining positional accuracy.

Both elevation and azimuth drive assemblies designed and used on the initial system, utilize a skew-axis Helicon gear system (pinion and gear) although the pivot plate drive system can be used on any intersecting shaft gearing system. This includes worm, Hypoid and spiral bevel gears. The drive pinions used are a through-shaft design mating with flat-faced bronze gears.

The resultant tooth forces of a non-parallel axis gearing system are largely in the axial direction of the pinion, however it also has components working in the radial direction of the pinion, which tend to separate the pinion and gear teeth. There is a need to maintain the effective positive control of the gear backlash, while accommodating the mounting and machining tolerances that cause tooth-to-tooth errors. This is accomplished by a unique spring-loaded pivot plate design that absorbs gear/pinion variations as they mesh. The pinion motor assembly on both the elevation and azimuth assemblies pivot radially, maintaining tight perpendicularity tolerances with respect to its mating gear.

The following paragraphs describe in detail the apparatus to perform mobile surveys from a vehicle, resulting in accurate ranging information to locate utility assets, therein describing the construction and operation of a gear driven alidade assembly 1 of FIG. 1.

FIG. 1 shows an illustration of an alidade assembly 1 mounted on a vehicle roof 2, depicting a survey of an utility pole asset 3. The driver/operator remotely controls the targeting of the alidade assembly from inside the vehicle through a touch screen monitor interface (not shown). As the operator rotates the alidade assembly, the new position of DRA 4 (FIG. 2) is compared to a reference position and the azimuth and elevation changes are automatically calculated mathematically, giving an accurate location (height, longitude and latitude) of the asset.

Figure 2:
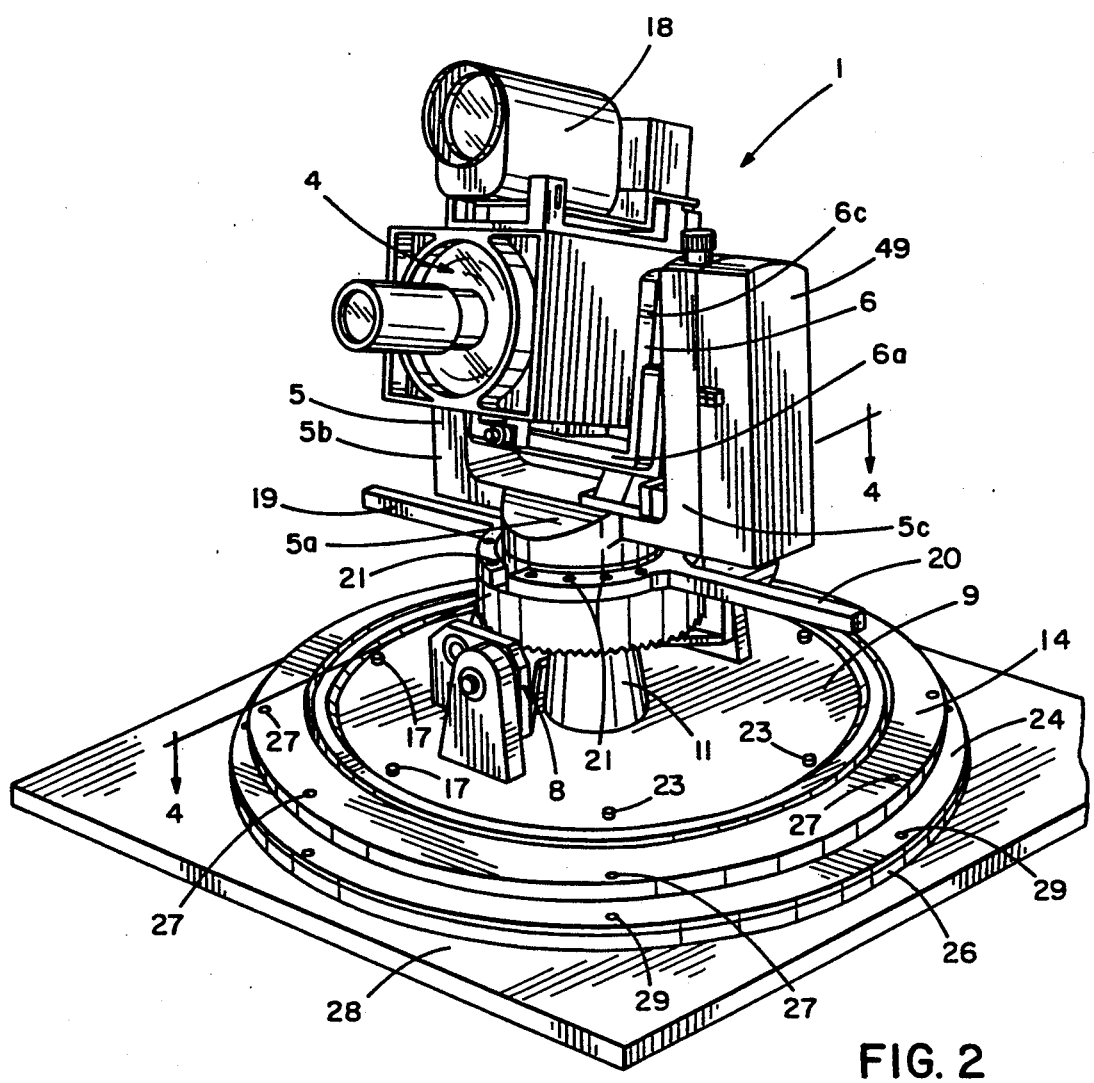
FIG. 2 is an isometric view of the alidade assembly with the protective cover removed, which shows the DRA, drive assemblies, video camera and mounting plates.
Figure 3:
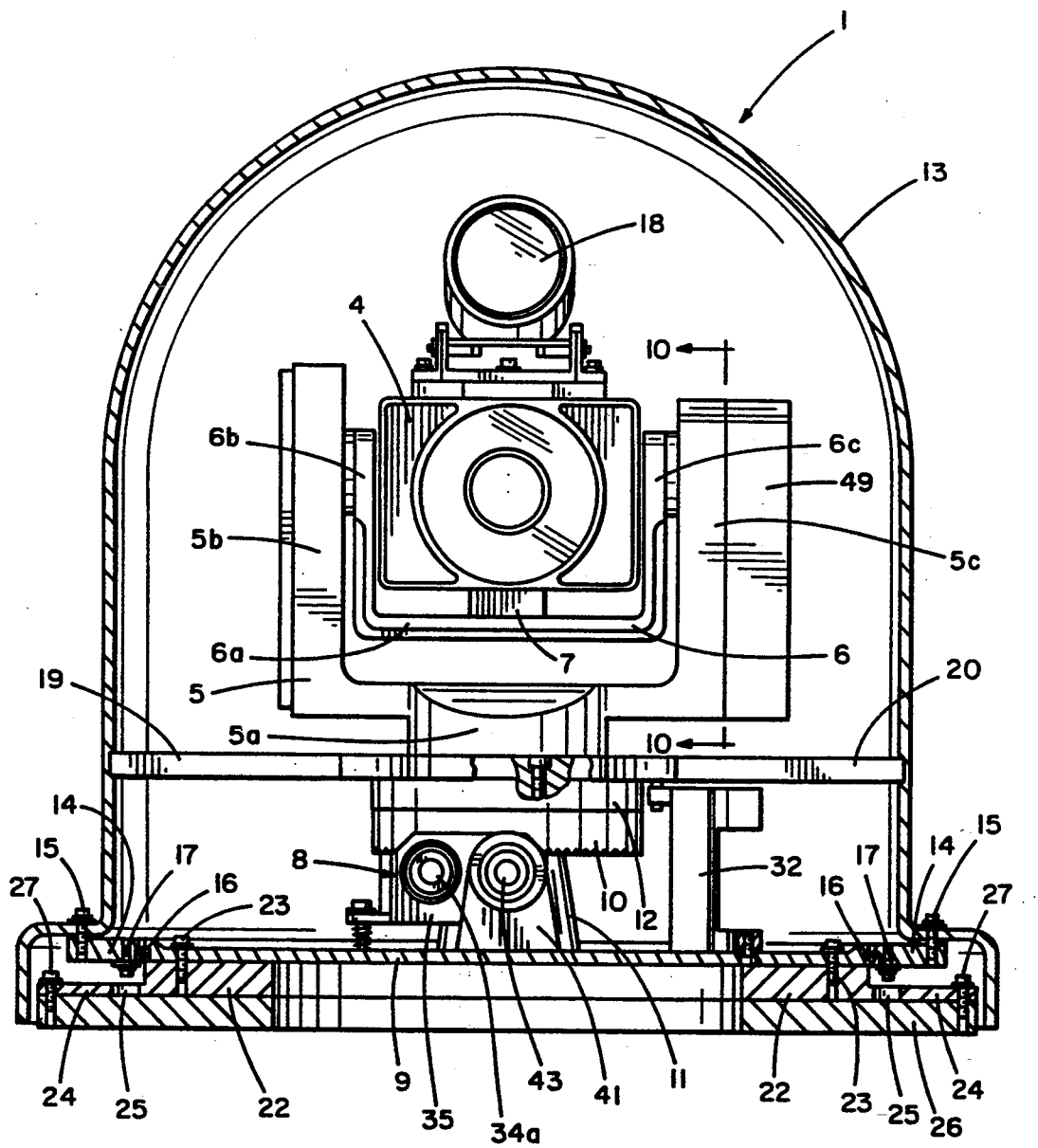
FIG. 3 is a partial cross-section view of the alidade assembly, with the protective cover installed.
Figure 4:
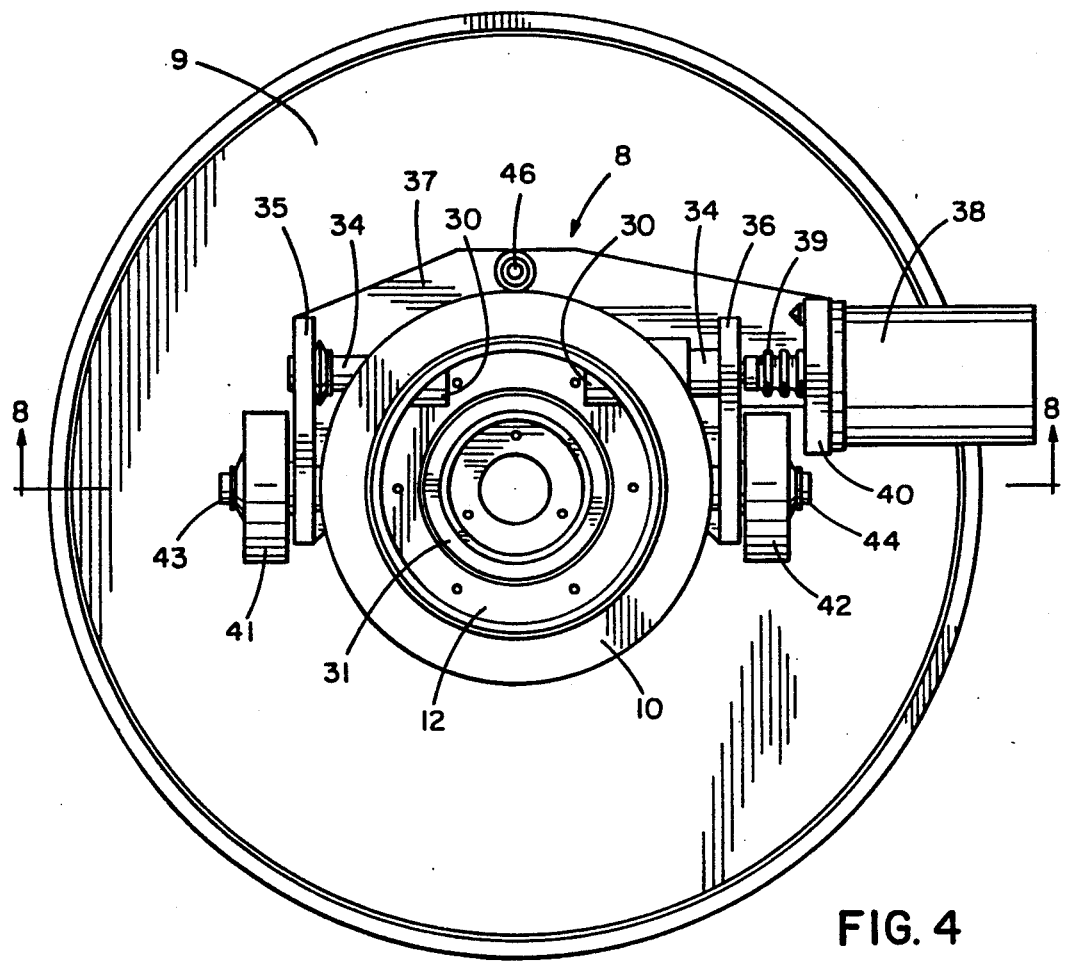
FIG. 4 is a section view taken along line 4—4 of FIG. 2 which shows a top view of only the azimuth drive assembly with the azimuth bearing housing installed on the mounting base.

The overall mechanical construction of alidade assembly 1 is best shown in FIGS. 2 and 3. DRA 4 provides ranging information by use of a conventional prior-art infrared laser-pulsed head. DRA 4 is supported for controlled movements on intercoupled azimuth yoke 5 and elevation yoke 6.

Azimuth yoke 5 is formed with a yoke base 5a which carries a pair of spaced yoke arms 5b and 5c. These azimuth yoke arms envelope DRA 4. Elevation 6 is located within azimuth yoke 5, and its yoke arms 6b and 6c are pivotally coupled (gimbeled) to azimuth yoke arms 5b and 5c, respectively. Connecting support block 7 rigidly affixes DRA 4 to elevation yoke central section 6a.

The azimuth and elevation drive power applied to yokes 5 and 6 move DRA 4 responsively to focus upon any desired object, such as utility pole 3 (FIG. 1). Azimuth information is supplied from an optical encoder (not shown) housed internally within azimuth yoke base 5a. In general, these azimuth information signals power azimuth drive-motor assembly 8 (FIGS. 4-9) which is supported on circular mounting plate 9.

Figure 5:
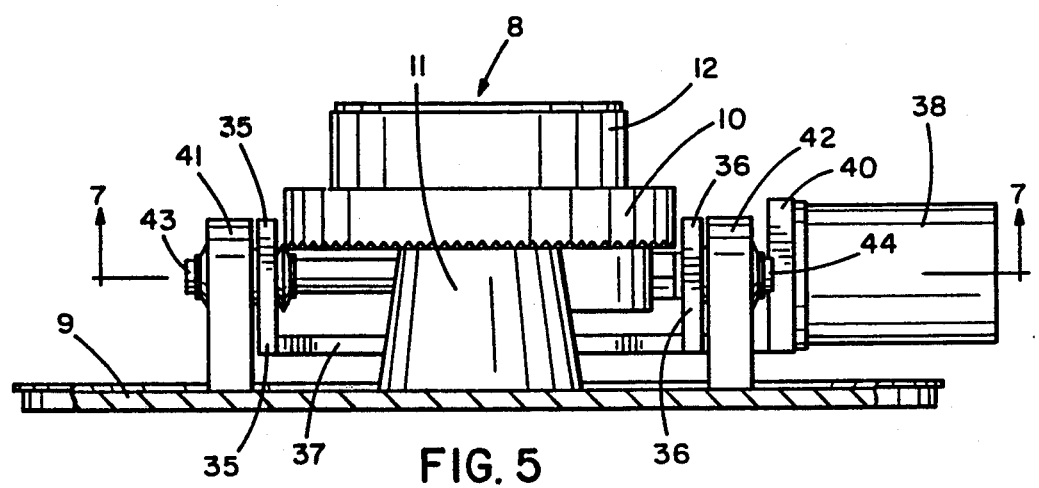
FIG. 5 is a front view of FIG. 4 which shows the azimuth drive assembly with the azimuth bearing housing installed on the mounting base.
Figure 6:
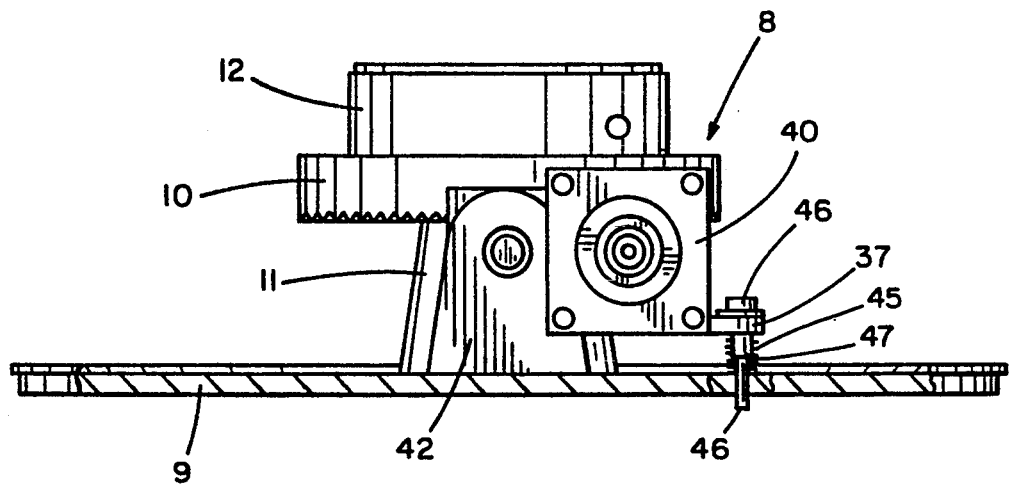
FIG. 6 is a side view of FIG. 4 showing the azimuth drive assembly (with the stepper motor removed) with the azimuth bearing housing installed on the mounting base.
Figure 8:
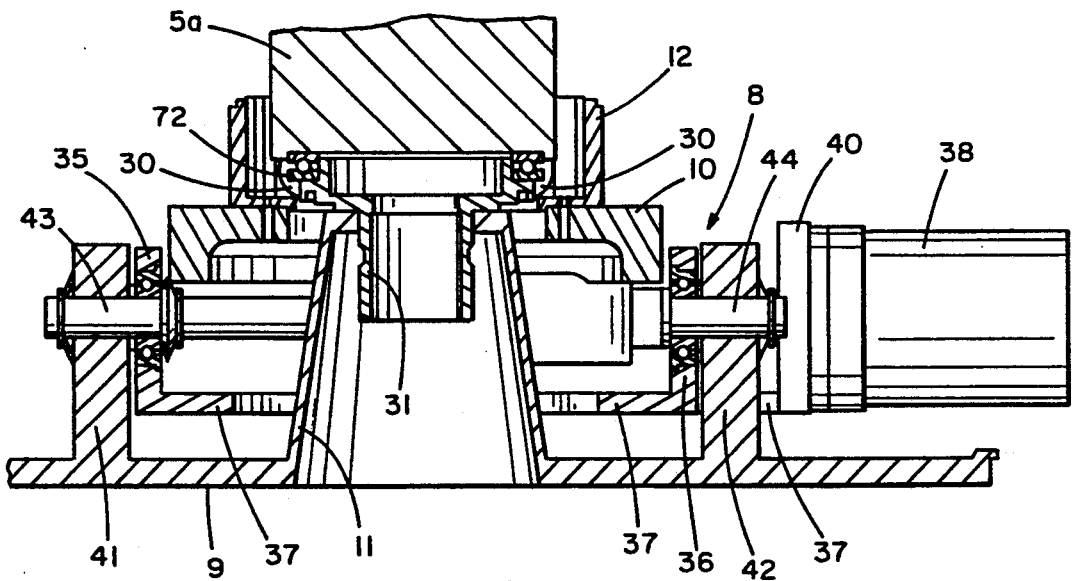
FIG. 8 is a section view taken along line 8—8 of FIG. 4 which shows the azimuth drive assembly with the azimuth bearing housing attached.
Figure 9:
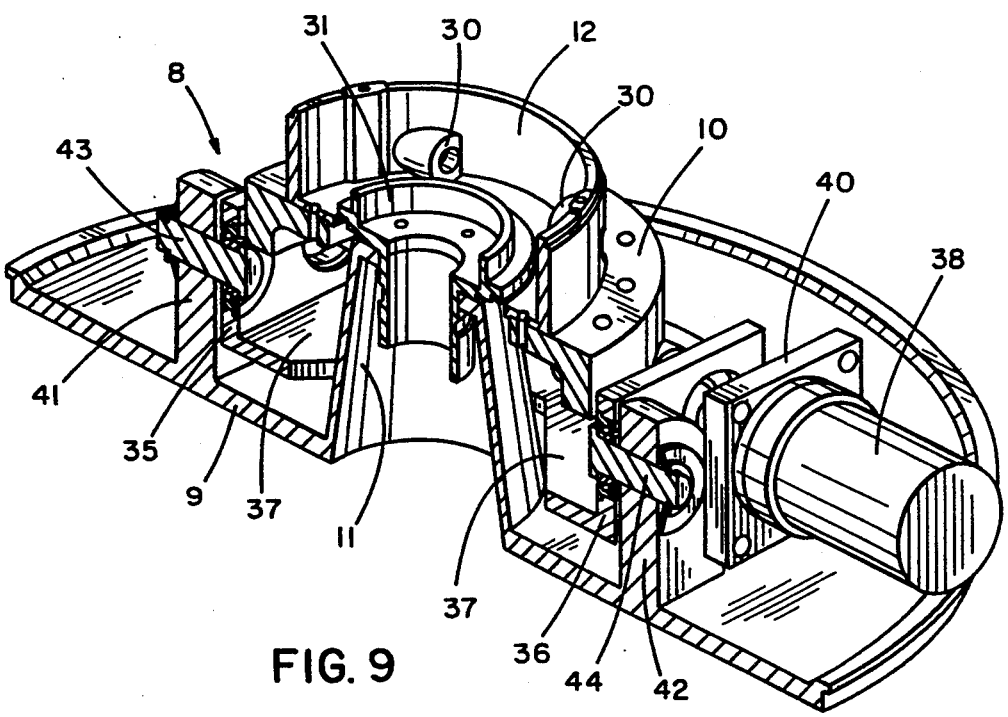
FIG. 9 is an isometric view in cross-section of the structure of FIG. 8 which shows the azimuth drive assembly with the azimuth bearing housing attached.

Mounting plate 9 is fixed relative to vehicle 2 upon which alidade assembly 1 is mounted. Azimuth drive-motor assembly 8, as herein after outlined in detail, is coupled to azimuth driven ring gear 10 (FIGS. 5, 8 and 9). Ring gear 10 is supported on a fixed frusto-conical support 11 for relative circular movement when ring gear 10 is driven by azimuth drive-motor assembly 8. Annular housing 12 is fixed to gear 10. Housing 12 supports azimuth yoke base 5a. Accordingly, activation of azimuth drive-motor assembly 8, rotates ring gear 10, housing 12 and ultimately the gimbeled azimuth yoke 5 and elevation yoke 6.

A protective fiberglass dome 13 (FIG. 3) is fixed to a free-rotating ring 14 by a set of screws 15. Rotatable ring 14 is coupled to the periphery of fixed mounting plate 9 by a set of ring bearings 16. A set of screws 17 fixes the cage for bearings 16 to mounting plate 9. Dome 13 covers DRA 4, CCD camera 18 and the alidade drive assemblies. A set of dome drive arms 19 and 20 (FIGS. 2 and 3) are fixed by a set of screws 21 to the top of housing 12. These arms rotate responsively to the movement of driven ring gear 10. The extremities of dome drive arms 19 and 20 engage and are locked into mating slots formed into dome 13 to drive the dome responsively with respect to the azimuth movements of DRA 4 and camera 18. Dome 13 is also formed with an elongated vertical opening (not shown) through which DRA 4 and camera 18 sight any desired object to be surveyed, such as asset 3 (FIG. 1).

Stationary mounting plate 9 is secured to stationary connector plate 22 by a set of screws 23 (FIGS. 2 and 3). Connector plate 22 is formed with a peripheral flange 24 that includes a set of holes 25 aligned with screws 17 so these screws may be accessed for adjustment of free-rotating ring 14. Stationary base plate 26 is fastened to converter plate 22 by a set of screws 27. Base plate 26 is in turn fastened to an enlarged vehicle attachment plate 28 by a set of screws 29. Attachment plate 28 is typically rectangular in shape and is securely fastened to the top of vehicle 2 (FIG. 1) to permit unobstructed viewing by alidade assembly 1.

Azimuth drive-motor assembly 8 (FIG. 4–9) drives ring gear 10. Yoke base 5a of azimuth yoke is lodged in part within the cavity defined by bearing housing 12. Yoke base 5a is secured to housing 12 by screw attachment to fastener nodules 30 (FIG. 9). Yoke base 5a is supported on bearing support 31 by a set of bearings 72. Bearing support 31 is fixed to frusto-conical support 11. Accordingly, azimuth drive-motor assembly 8 rotates ring gear 10, bearing housing 12, and the gimbeled yokes 5 and 6 in a tangential plane. The support for these rotational elements is provided by frusto-conical support 11 and bearing support 31. A mechanical stop block 32 (FIG. 3) prevents the alidade yokes 5 and 6 from rotating beyond 360 degrees.

Figure 7:
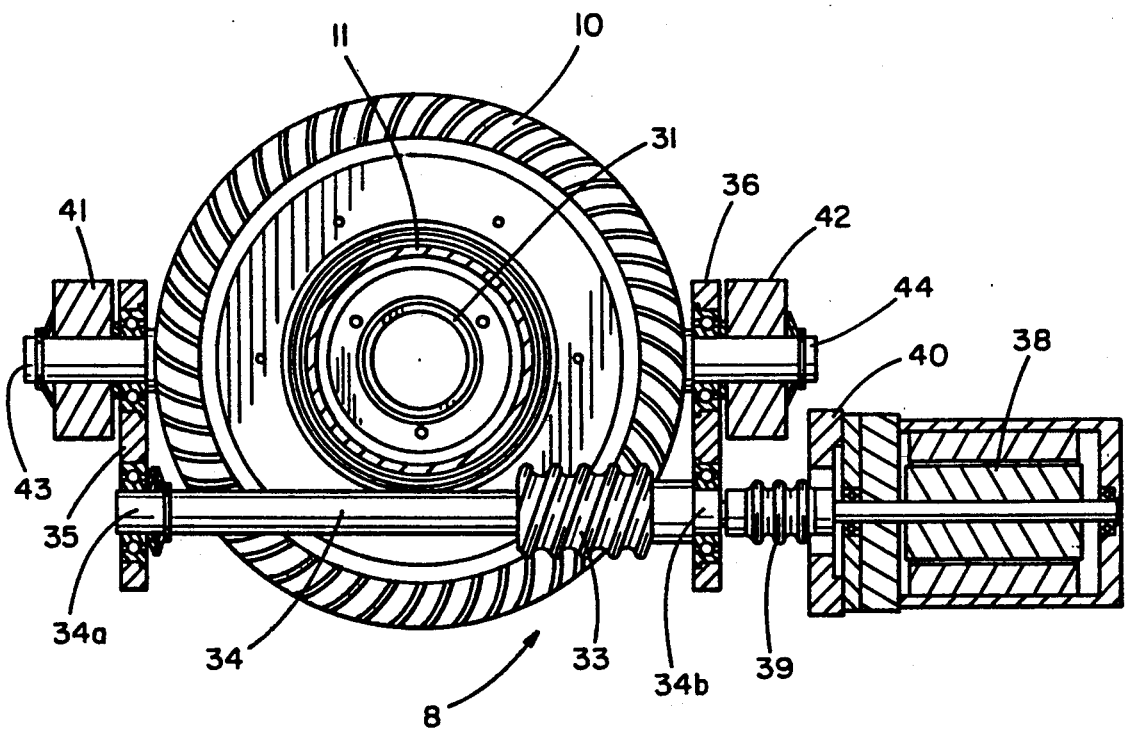
FIG. 7 is a section view taken along line 7—7 of FIG. 5 which shows the azimuth drive assembly and its skew-axis Helicon pinion and gear interface.

Azimuth drive power is applied to ring gear 10 by pinion gear 33 (FIG. 7). Pinion gear 33 is carried on elongated pinion gear shaft 34. The ends 34a and 34b of shaft 34 are journaled on a pair of shaft support posts 35 and 36 which project from pivot plate 37. Stepper motor 38 is connected to end 34b of pinion gear shaft 34 through flexible coupling 39. Stepper motor 38 is supported on pivot plate 37 by motor support post 40 (FIGS. 8 and 9). Accordingly, the entire pinion gear assembly including components 33, 34, 35, 36, 38, 39, and 40 are supported on pivot plate 37 and pivot with plate 37 relative to stationary mounting plate 9. All of these components of azimuth drive-motor assembly 8 are supported on mounting plate 9 by a pair of spaced base supports 41 and 42 which are an integral part of base 9. Two stationary pivot pins 43 and 44 are fixed to base support posts 41 and 42. Pinion shaft support posts 35 and 36 are journaled to the inwardly projecting ends of pins 43 and 44.

As azimuth stepper motor 38 receives electrical pulses from a motor controller (not shown) located within vehicle 2, azimuth stepper motor 38 drives azimuth pinion gear 33 through flexible coupling 39. Coupling 39 provides both an angular and parallel connection between stepper motor 38 and pinion gear shaft alignment, as well as maintaining zero backlash in both directions of rotational azimuth travel.

The resultant tooth forces of pinion gear 33 and ring gear 10 are largely directed in the axial direction of the pinion, however, there are other components working in the radial direction of the pinion which tend to separate the pinion and gear teeth. This tendency is overcome by a force exerted by coil spring 45 (FIG. 6) against pivot plate 37 which keeps the pinion and ring gear teeth in engagement. Spring 45 envelopes the shank of plunger bolt 46 which is fixed to pivot plate 37 and which extends through an aligned hole (not shown) in mounting plate 9. The lower portion of plunger bolt 46 has a reduced diameter shank. Shank shoulder 47 formed by this difference in diameters serves as a stop when it contacts the upper surface of mounting plate 9. This mechanical stop prevents the teeth of pinion gear 33 and ring gear 10 from completely disengaging and possibly damaging the gear teeth.

Figure 10:
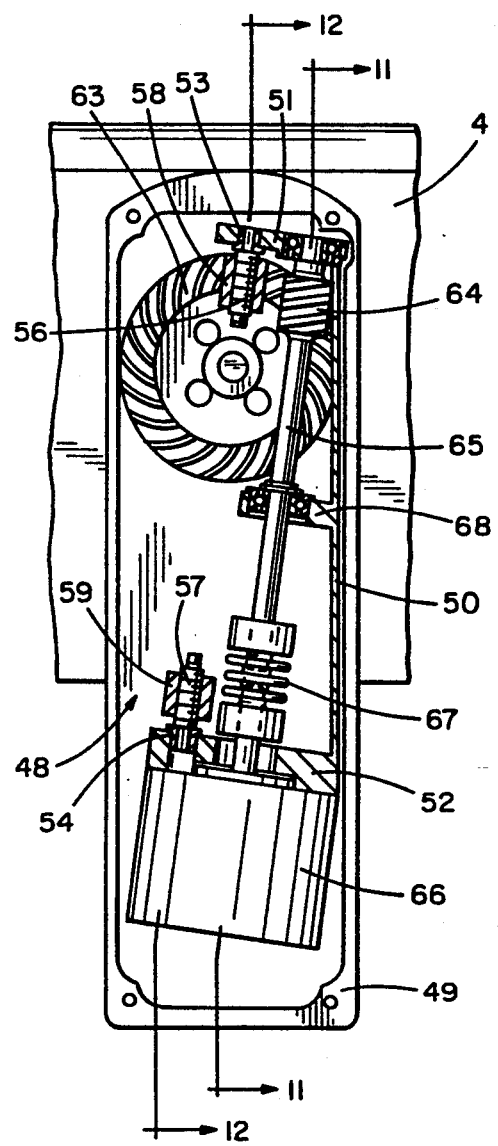
FIG. 10 is a section view taken along line 10—10 of FIG. 3 which shows the front section view of the elevation drive assembly mounted in the alidade yoke base.
Figure 11:
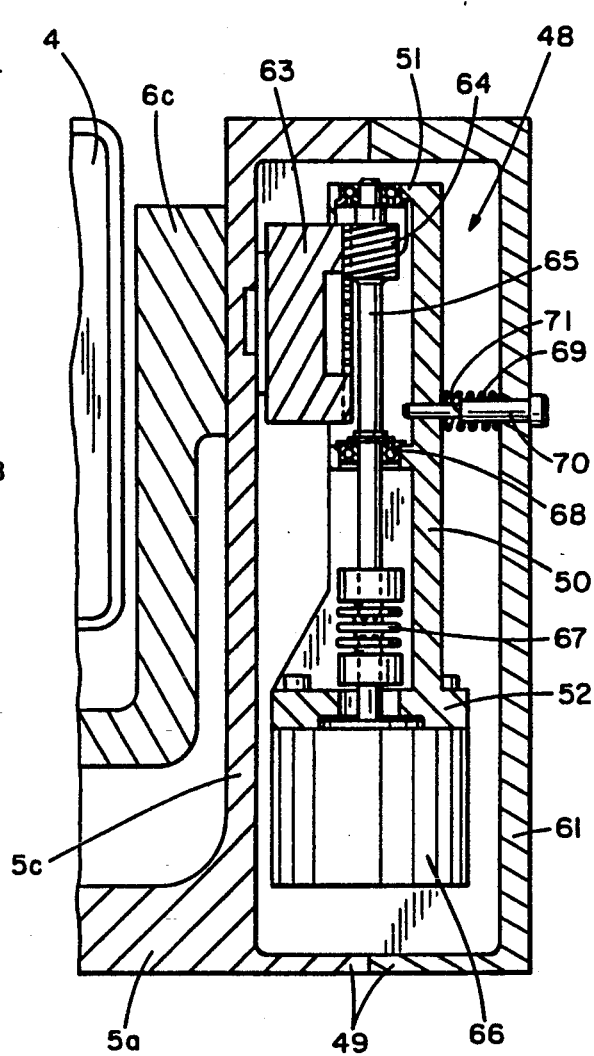
FIG. 11 is a section view taken along line 11—11 of FIG. 10 which shows the elevation drive assembly mounted in the alidade yoke base.
Figure 12:
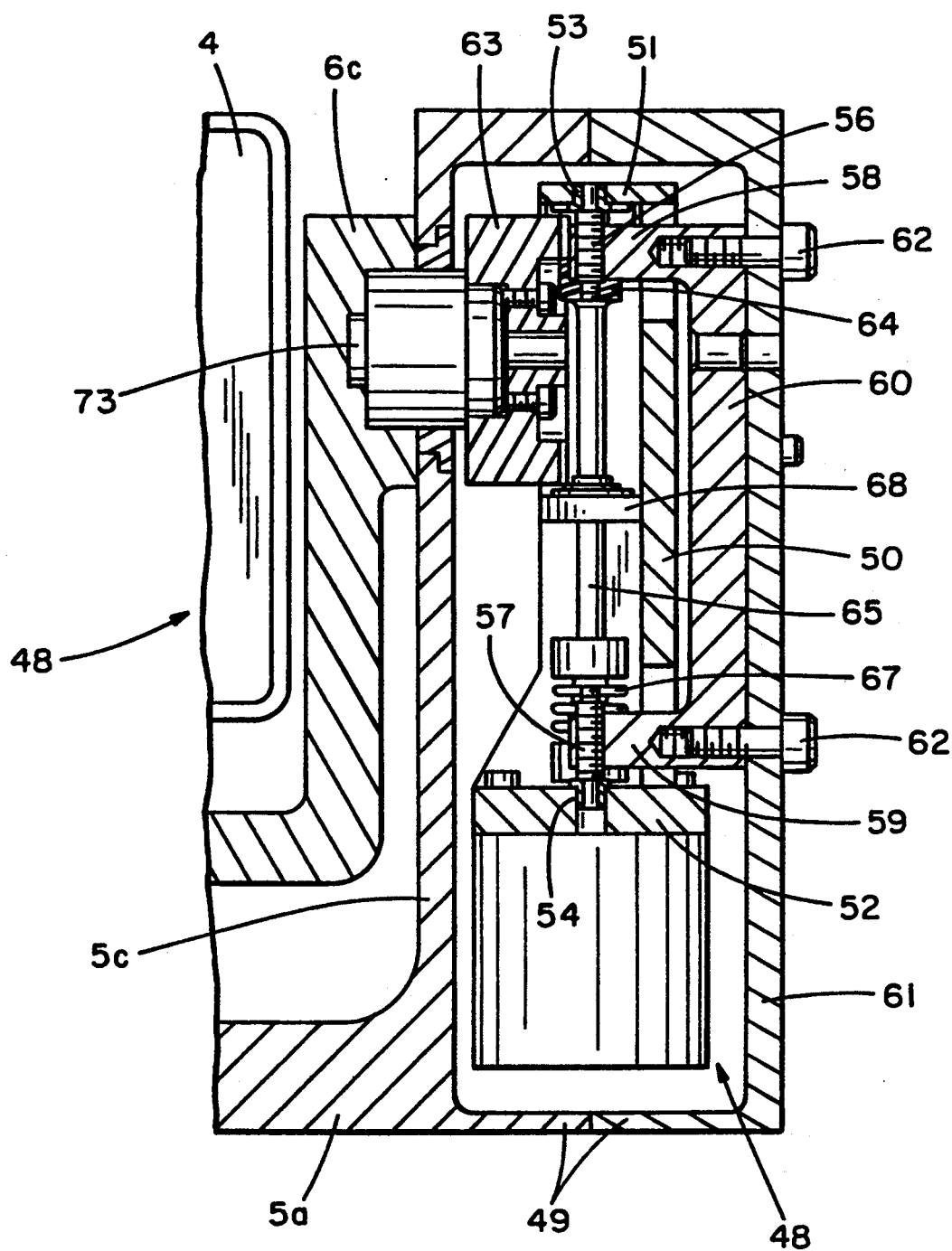
FIG. 12 is a section view taken along line 12—12 of FIG. 10 which shows a cross-section of the elevation drive assembly mounted in the alidade yoke base, demonstrating the elevation drive assembly mounting interface to the elevation housing cover.

The elevation drive-motor assembly 48 (FIGS. 10–12) is located within housing 49 (FIGS. 2 and 3). Housing 49 is fixed to azimuth yoke arm 5c and moves responsively with azimuth yoke 5. Elevation drive-motor assembly 48 is constructed and also operates in a manner similar to azimuth drive-motor assembly 8. Pivot plate 50 is formed with a pair of spaced shaft support posts 51 and 52 (FIG. 10). A pair of spaced co-linear bushings 53 and 54 are carried by these posts, and pivot plate 50 pivots relative to these bushings. Bushings 53 and 54 are carried on a pair of threaded pivot pins 56 and 57 which are fixed to support posts 58 and 59 carried on bracket 60. Bracket 60 (FIG. 12) is secured to removable cover 61 by a set of screws 62.

Elevation ring gear 63 is coupled to elevation yoke arm 6c by drive shaft 73. Ring gear 63 is driven by elevation pinion gear 64 which is carried on pinion gear shaft 65. Pinion gear shaft 65 is journaled and supported by shaft support posts 51 and 52. Elevation stepper motor 66 is coupled to pinion gear shaft 65 by flexible coupling 67. The central portion of pinion gear shaft 65 is supported by bearing support 68 which is fixed to pivot plate 50.

As is the case with azimuth drive-motor assembly 8, certain resultant tooth forces of elevation ring gear 63 and elevation pinion gear 64 are generated which tend to separate the pinion and gear teeth. This tendency is overcome in elevation drive-motor assembly 48 by a force generated by coil spring 69 (FIG. 11) against elevation pivot plate 50 which keeps the pinion and ring gear teeth in engagement. Spring 69 envelopes the shank of bolt 70. Bolt 70 is fixed to elevation housing cover 61. The left portion of bolt 70 has a reduced diameter shank. The shank shoulder 71 formed by this difference in diameters serves as a stop when shoulder 71 makes contact with pivot plate 50. This mechanical stop prevents the teeth of elevation ring gear 63 and elevation pinion gear 64 from separating.

Both the elevation and azimuth drive assemblies utilize a Helicon skew-axis gear set. The drive pinion gears are a through-shaft design effecting mating with flat-faced bronze gears.

The resultant tooth forces of a Helicon gearing system are largely in the axial direction of the pinion; however, such a system also has components working in the radial direction of the pinion, which tend to separate the pinion and gear teeth. Therefore, there is a need to maintain effective positive control of the gear backlash, while accommodating the mounting and machining tolerances that cause tooth-to-tooth errors. This is accomplished by the structure contemplated by the spring-loaded pivot plate design that absorbs gear-pinion variations as the gears mesh. The pinion motor assembly on both the elevation and azimuth assemblies pivot radially maintaining tight perpendicularity tolerances with respect to its mating gear.

It should be understood that modifications can be made in the above described preferred embodiment without departing from the scope of the invention. For example, this invention can be used with any other type of intersecting gear shaft design including worm gears, Hypoid gears, and spiral bevel gears.

What is claimed is:

1. An alidade surveying instrument, comprising a ranging device for targeting a remote object to determine the location of the remote object, an alidade assembly mounting base, a yoke supporting the ranging device for rotatable targeting movement, a driven gear fixedly coupled to the yoke for rotating the yoke in a first plane with the yoke, driven gear and the ranging device being supported by the mounting base, a pivot plate supported by the mounting base for a pivoting movement relative to the driven gear, a motor and a drive gear coupled to the motor with both the motor and the drive gear being supported on the pivot plate, and means coupled to the pivot plate and carried by the mounting base for applying a variable force for driving the drive and driven gears into a yielding engagement to counteract physical variations in the degree of gear set engagement as the gears mesh and rotate relative to one another.

2. The alidade surveying instrument of claim 1 in which the yoke is formed with a pair of spaced yoke arms joined by a yoke base section and with the ranging device being disposed between the spaced yoke arms, the driven gear is a ring gear coupled to the yoke base section to drive the yoke in an azimuth determining plane, and the drive gear is a pinion gear engaging the ring gear with the pivoting axis of the pivot plate being stationary relative to the movements of the yoke and the ranging device in the azimuth determining plane.

3. The alidade surveying instrument of claim 2 in which the pinion and ring gears rotate on axes disposed at right angles relative to one another, and in which the pivoting axis of the pivot plate is at a right angle to the axis of rotation of the ring gear.

4. The alidade surveying instrument of claim 3, comprising a flexible coupling connecting the motor to the pinion gear.

5. The alidade surveying instrument of claim 3, comprising stop means coupled to the pivot plate to limit he extent to which the pinion gear can disengage from the ring gear.

6. The alidade surveying instrument of claim 2 in which the yoke is an azimuth yoke rotating on a vertical or generally vertical axis.

7. The alidade surveying instrument of claim 2 comprising an elevation yoke having a pair of spaced yoke arms with the elevation yoke being disposed within and coupled to the azimuth yoke arms for rotation on a horizontal or generally horizontal axis, an elevation driven ring gear fixedly coupled to the elevation yoke for rotating the elevation yoke on the axis of rotation oft he elevation yoke, an elevation pivot plate supported on one of the azimuth yoke arms for a pivoting movement relative to the elevation ring gear, an elevation drive motor and an elevation drive pinion gear coupled to the elevation drive motor with both the elevation drive motor and the elevation drive pinion gear being supported on the elevation pivot plate, and means coupled to the elevation pivot plate for applying a variable force driving the elevation driven ring gear and the elevation drive pinion gear into a yielding engagement to counteract physical variations in the degree of elevation gear set engagement as the gears mesh and rotate relative to one another.

8. The alidade surveying instrument of claim 7, in which the azimuth pinion and ring gears rotate on perpendicular axes relative to one another, the elevation pinion and ring gears rotate on perpendicular axes relative to one another, and in which the pivoting axis of each of the azimuth and elevation pivot plates is perpendicular to the axis of rotation of its associated driven ring gear.

9. The alidade surveying instrument of claim 7, comprising a flexible coupling for each of the elevation and azimuth gear sets with each flexible coupling connecting its associated drive motor to its associated drive pinion gear.

10. The alidade surveying instrument of claim 7, comprising individual stop means coupled to each of the azimuth and elevation pivot plates to limit the extent to which each associated drive pinion gear and driven ring gear can disengage from one another.

* * * * *